(12) United States Patent
Lee et al.

(10) Patent No.: US 12,142,435 B2
(45) Date of Patent: Nov. 12, 2024

(54) MULTILAYER CAPACITOR

(71) Applicant: SAMSUNG ELECTRO-MECHANICS CO., LTD., Suwon-si (KR)

(72) Inventors: Jang Ho Lee, Suwon-si (KR); Ki Pyo Hong, Suwon-si (KR); Sung Hoon Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 270 days.

(21) Appl. No.: 17/726,880

(22) Filed: Apr. 22, 2022

(65) Prior Publication Data

US 2023/0139075 A1    May 4, 2023

(30) Foreign Application Priority Data

Nov. 4, 2021 (KR) .................. 10-2021-0150400

(51) Int. Cl.
*H02H 9/00*  (2006.01)
*H01G 4/012* (2006.01)
*H01G 4/232* (2006.01)
*H01G 4/30*  (2006.01)
*H01G 4/12*  (2006.01)

(52) U.S. Cl.
CPC .............. *H01G 4/30* (2013.01); *H01G 4/012* (2013.01); *H01G 4/232* (2013.01); *H01G 4/1227* (2013.01)

(58) Field of Classification Search
CPC ........... H01G 4/30; H01G 4/012; H01G 4/232

USPC ........................................................... 361/53
See application file for complete search history.

(56) References Cited

U.S. PATENT DOCUMENTS

| 2008/0130198 | A1* | 6/2008 | Nakano ................. | H01G 4/012 |
| | | | | 361/303 |
| 2011/0157765 | A1 | 6/2011 | Kim et al. | |
| 2019/0304697 | A1* | 10/2019 | Nakamura ............ | H01G 4/232 |
| 2020/0373087 | A1* | 11/2020 | Kato ...................... | H01G 4/248 |

FOREIGN PATENT DOCUMENTS

| JP | 2019-176127 A | 10/2019 |
| JP | 2020-191330 A | 11/2020 |
| KR | 10-2011-0074259 A | 6/2011 |

* cited by examiner

*Primary Examiner* — Jared Fureman
*Assistant Examiner* — Lucy M Thomas
(74) *Attorney, Agent, or Firm* — MORGAN, LEWIS & BOCKIUS LLP

(57) ABSTRACT

A multilayer capacitor includes: a body including a multilayer structure in which one or more first internal electrodes and one or more second internal electrodes are alternately stacked in a first direction with one or more dielectric layers interposed therebetween; and first and second external electrodes disposed on the body and spaced apart from each other to be connected to the first internal electrodes and the second internal electrodes, respectively. The body further includes: a plurality of side margin layers with the multilayer structure interposed therebetween in a second direction, perpendicular to the first direction; and one or more edge margin portions for providing a margin between an edge of at least one of the side margin layers in a third direction and the multilayer structure, and between an edge of at least one of the side margin layers in the first direction and the multilayer structure.

20 Claims, 7 Drawing Sheets

MULTILAYER CAPACITOR

CROSS-REFERENCE TO RELATED APPLICATION(S)

This application claims the benefit of priority to Korean Patent Application No. 10-2021-0150400 filed on Nov. 4, 2021 in the Korean Intellectual Property Office, the disclosure of which is incorporated herein by reference in its entirety.

BACKGROUND

1. Technical Field

The present disclosure relates to a multilayer capacitor.

2. Description of Related Art

Multilayer capacitors are widely used as components of electronic devices such as computers, personal digital assistants (PDAs), and mobile phones because they are easy to mount while ensuring high capacitance with small size. Also, multilayer capacitors are widely used as components of electrical devices (including vehicles) because of their high-reliability and high-strength characteristics.

SUMMARY

An aspect of the present disclosure may provide a multilayer capacitor for efficiently improving at least a portion of overall performance (e.g., reliability, capacitance, and miniaturization).

According to an aspect of the present disclosure, a multilayer capacitor may include: a body including a multilayer structure in which one or more first internal electrodes and one or more second internal electrodes are alternately stacked in a first direction with one or more dielectric layers interposed therebetween; and first and second external electrodes disposed on the body and spaced apart from each other to be connected to the one or more first internal electrodes and the one or more second internal electrodes, respectively. The body further includes: a plurality of side margin layers with the multilayer structure interposed therebetween in a second direction, perpendicular to the first direction; and one or more edge margin portions configured to provide a margin, in which a first portion of the margin is disposed between an edge of at least one of the plurality of side margin layers in a third direction, perpendicular to the first and second directions, and a second portion of the margin is disposed the multilayer structure, and between an edge of at least one of the plurality of side margin layers in the first direction and the multilayer structure.

According to another aspect of the present disclosure, a multilayer capacitor may include: a body including a multilayer structure in which one or more first internal electrodes and one or more second internal electrodes are alternately stacked in a first direction with one or more dielectric layers interposed therebetween; and first and second external electrodes disposed on the body while being spaced apart from each other to be connected to the one or more first internal electrodes and the one or more second internal electrodes, respectively, wherein the one or more first internal electrodes and the one or more second internal electrodes include: upper and lower internal electrodes; and central internal electrodes disposed between the upper and lower internal electrodes, having a greater median width than the upper and lower internal electrodes, and recessed at a plurality of corners.

According to still another aspect of the present disclosure, a multilayer capacitor may include: a body including a multilayer structure in which one or more first internal electrodes and one or more second internal electrodes are alternately stacked in a first direction with one or more dielectric layers interposed therebetween; and first and second external electrodes disposed on the body and spaced apart from each other to be connected to the one or more first internal electrodes and the one or more second internal electrodes, respectively. The body further includes cover layers disposed above and below the multilayer structure in the first direction, and side margin layers with the multilayer structure interposed therebetween in a second direction perpendicular to the first direction, the multilayer structure being surrounded by the cover layers and the side margin layers. In a view from the first direction, the multilayer structure has a first cutout portion at each corner thereof, the first cutout portion being free of a portion of an internal electrode, and in a cross-section view from a third direction, perpendicular to the first and second directions, the multilayer structure includes a second cutout portion at each corner thereof, the second cutout portion being free of an internal electrode.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
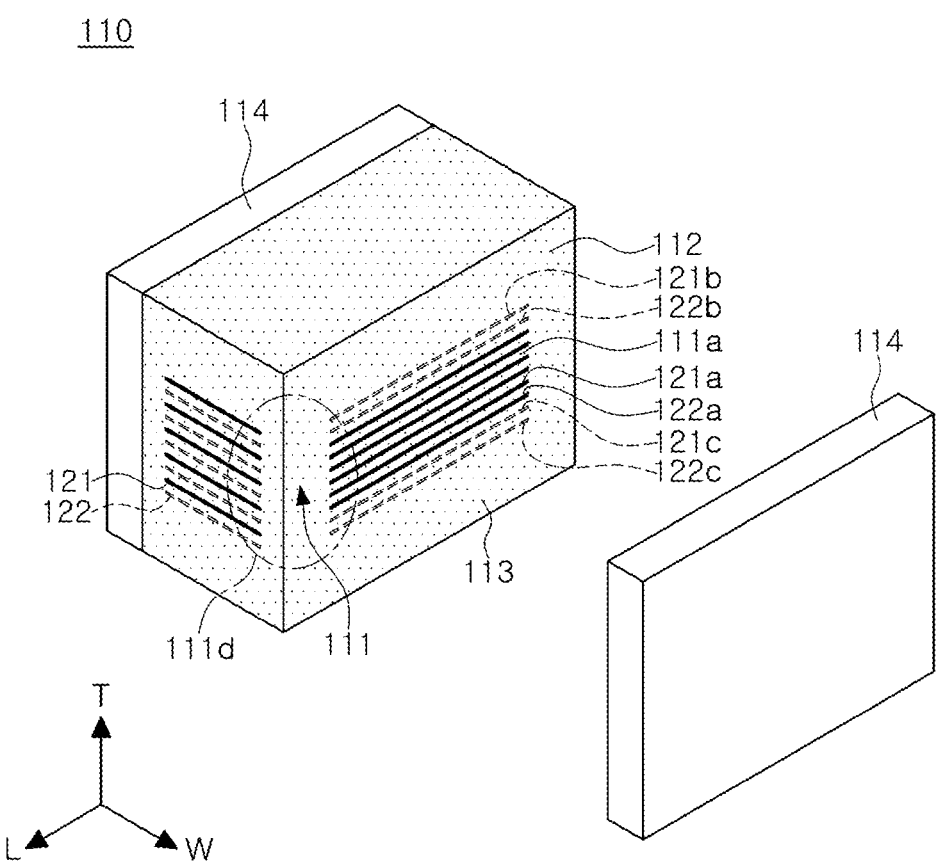
FIG. 1 is a perspective view illustrating a body included in a multilayer capacitor according to an exemplary embodiment of the present disclosure.

Hereinafter, exemplary embodiments of the present disclosure will now be described in detail with reference to the accompanying drawings.

In order to clarify the exemplary embodiments of the present invention, directions of a hexahedron may be defined as follows: L, W, and T shown in the drawings denote a length direction, a width direction, and a thickness direction, respectively. Here, the thickness direction may be used to have the same concept as a direction in which dielectric layers are stacked.

Hereinafter, a multilayer capacitor according to an exemplary embodiment of the present disclosure will be described. In particular, a multilayer ceramic capacitor will be described, but the present disclosure is not limited thereto.

Figure 2:
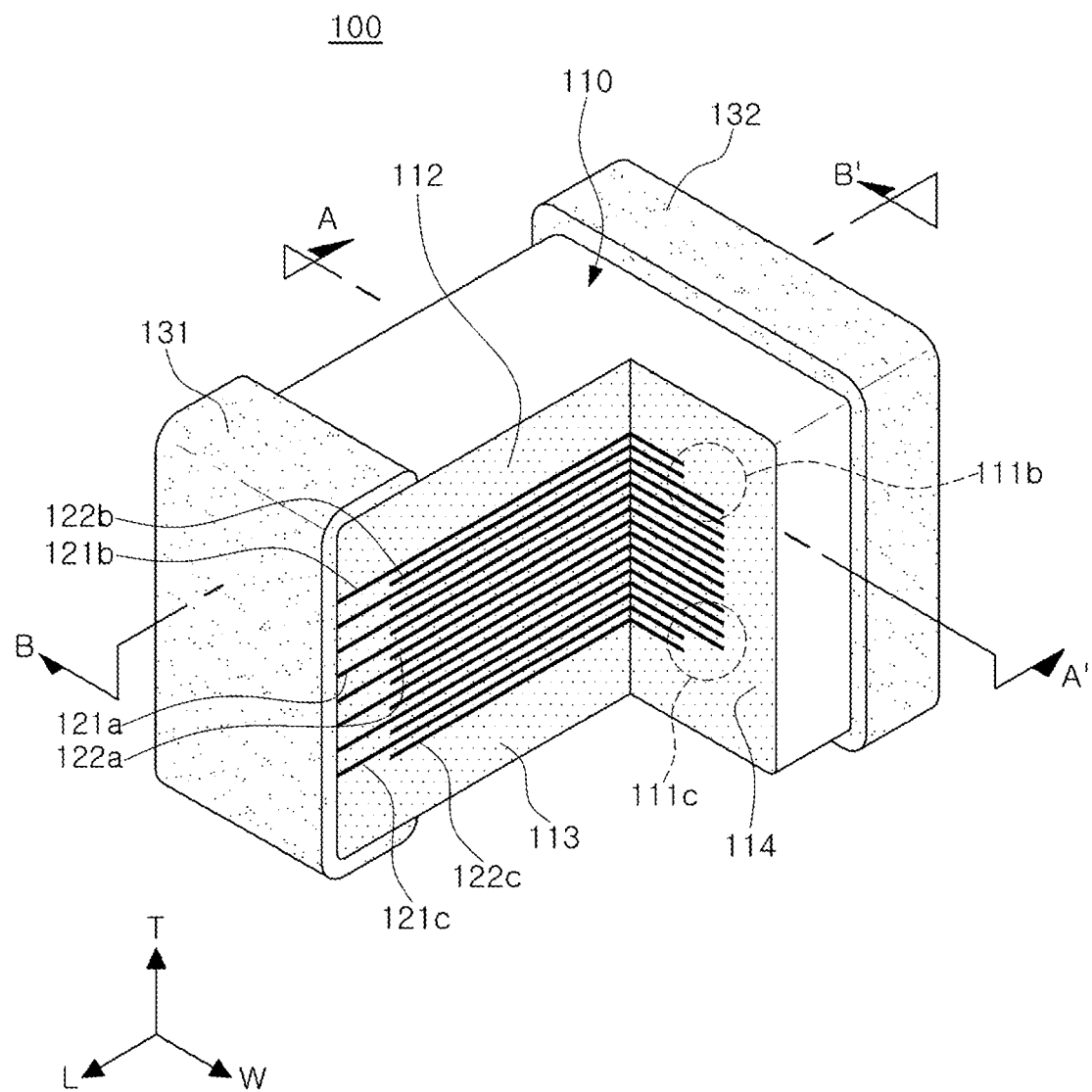
FIG. 2 is a perspective view illustrating the multilayer capacitor according to the exemplary embodiment of the present disclosure.
Figure 4:
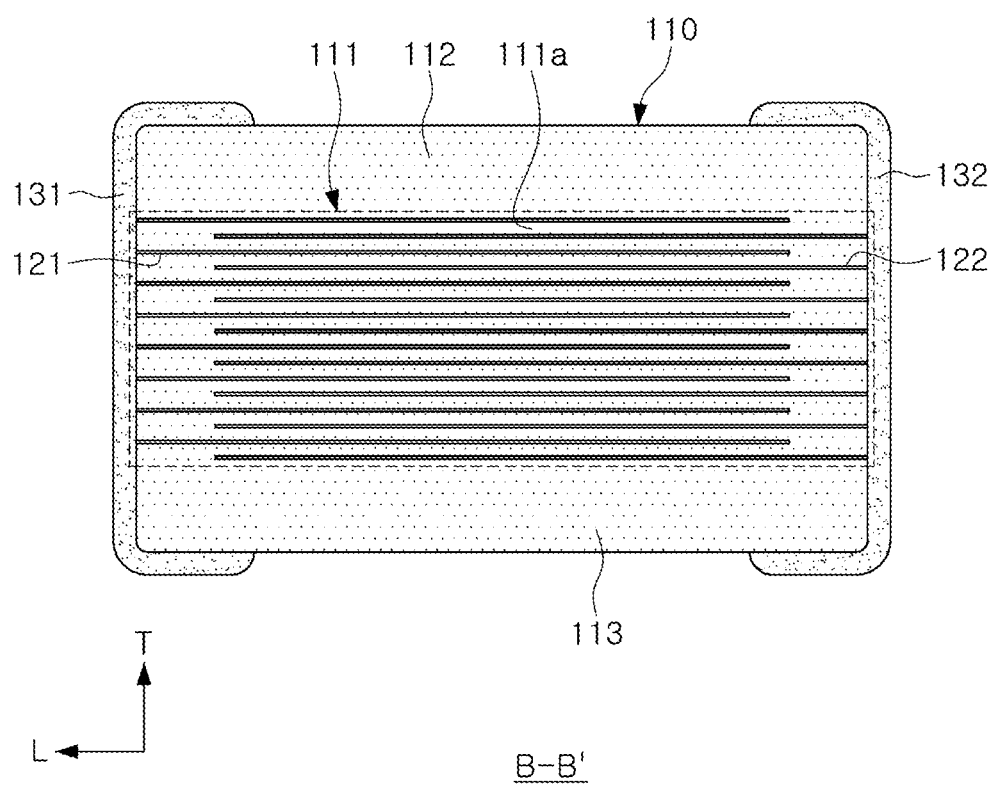
FIG. 4 is a cross-sectional view taken along line B-B' of FIG. 2.

FIG. 1 is a perspective view illustrating a body included in a multilayer capacitor according to an exemplary embodiment of the present disclosure, FIG. 2 is a perspective view illustrating the multilayer capacitor according to the exemplary embodiment of the present disclosure, and FIG. 4 is a cross-sectional view taken along line B-B' of FIG. 2.

Referring to FIGS. 1, 2, and 4, a multilayer capacitor 100 according to an exemplary embodiment of the present disclosure may include a body 110, a first external electrode 131, and a second external electrode 132. In FIG. 2, the inside of the body 110 is illustrated in a state in which the multilayer capacitor 100 is cut as much as about ¼ of its volume, but the multilayer capacitor 100 may actually not be cut as much as about ¼ of its volume, and may be substantially symmetrical with respect to the center thereof in the L direction, the W direction, and the T direction.

The body 110 may include a multilayer structure 111 in which one or more first internal electrodes 121 and one or more second internal electrodes 122 are alternately stacked in a first direction (e.g., T direction) with one or more dielectric layers 111a interposed therebetween.

For example, the body 110 may be formed as a ceramic body by sintering the multilayer structure 111. Here, the one or more dielectric layers 111a disposed in the body 110 may be in a sintered state, and adjacent dielectric layers may be integrated to such an extent that it is difficult to determine a boundary therebetween unless a scanning electron microscope (SEM) is used.

For example, the body 110 may be formed as a hexahedron having opposite end surfaces in the length direction (L), opposite end surfaces in the width direction (W), and opposite end surfaces in the thickness direction (T), and edges and/or corners of the hexahedron may be rounded by being polished. However, the shape and dimension of the body 110 and the number of dielectric layers 111a stacked are not limited to what is illustrated in the present exemplary embodiment.

The one or more dielectric layers 111a may have a thickness arbitrarily changed according to the design for the capacitance of the multilayer capacitor 100, and may include ceramic powder having a high dielectric constant, e.g., barium titanate ($BaTiO_3$)-based powder, but the present disclosure is not limited thereto. For example, the ceramic powder may be at least one of strontium titanate ($SrTiO_3$)-based powder, calcium titanate ($CaTiO_3$)-based powder, and calcium zirconate ($CaZrO_3$)-based powder. In addition, according to the required specification of the multilayer capacitor 100, various ceramic additives (e.g., $MgO$, $Al_2O_3$, $SiO_2$, and $ZnO$), organic solvents, plasticizers, binders, dispersants, etc. may be added to the ceramic powder.

An average particle diameter of the ceramic powder used to form one or more dielectric layers 111a is not particularly limited, and may be adjusted according to the required specification of the multilayer capacitor 100 (e.g., small size and/or high capacitance required by capacitors for electronic devices, or high withstand voltage and/or strong strength required by capacitors for electrical devices), but may be adjusted to, for example, 400 nm or less.

For example, the one or more dielectric layers 111a may be formed by applying and drying a slurry including powder, such as barium titanate ($BaTiO_3$)-based powder, on carrier films to provide a plurality of ceramic sheets. The ceramic sheet may be formed by manufacturing a sheet from a slurry to have a thickness of several μm by a doctor blade method, the slurry being prepared by mixing ceramic powder, a binder, and a solvent, but is not limited thereto.

The one or more first internal electrodes 121 and the one or more second internal electrodes 122 may be formed to be exposed alternately to one end surface and the other end surface of the body 110 in the length direction (L) along a direction (e.g., T direction) in which the dielectric layers are stacked, by printing a conductive paste including a conductive metal, and may be electrically insulated from each other by the dielectric layers disposed therebetween.

For example, each of the one or more first internal electrodes 121 and the one or more second internal electrodes 122 may be formed of a conductive paste for internal electrode including 40 to 50 wt % of conductive metal powder having an average particle size of 0.1 to 0.2 μm, but is not limited thereto. The conductive paste may be one of nickel (Ni), copper (Cu), palladium (Pd), silver (Ag), lead (Pb), platinum (Pt), and the like, or an alloy thereof, but the present disclosure is not limited thereto.

For example, an internal electrode pattern may be formed by applying the conductive paste for internal electrode on the ceramic sheet by a printing method or the like. As the method for printing the conductive paste, a screen printing method, a gravure printing method, an inkjet printing method, or the like may be used, but the present disclosure is not limited thereto. The body 110 may be manufactured by stacking, pressing, and sintering 200 to 300 ceramic sheets on which the internal electrode patterns are printed.

A capacitance of the multilayer capacitor 100 may be proportional to an area where the one or more first internal electrodes 121 and the one or more second internal electrodes 122 overlap each other in the stacked direction (e.g., T direction), proportional to the total number of one or more first internal electrodes 121 and one or more second internal electrodes 122 stacked, and inversely proportional to a distance between each of the one or more first internal electrodes 121 and each of the one or more second internal electrodes 122. The distance may be substantially equal to the thickness of each of the one or more dielectric layers 111a.

The multilayer capacitor 100 may have a higher capacitance compared to a thickness thereof as the distance between each of the one or more first internal electrodes 121 and each of the one or more second internal electrodes 122 is shorter. On the other hand, the multilayer capacitor 100 may have a higher withstand voltage as the distance is longer. Therefore, the distance may be adjusted according to the required specification of the multilayer capacitor 100 (e.g., small size and/or high capacitance required by capacitors for electronic devices, or high withstand voltage and/or strong strength required by capacitors for electrical devices). A thickness of each of the one or more first internal electrodes 121 and the one or more second internal electrodes 122 may also be affected by the distance.

For example, when the multilayer capacitor 100 is required to have a high withstand voltage and/or a strong strength, the multilayer capacitor 100 may be designed such that the distance between each of the one or more first internal electrodes 121 and each of the one or more second internal electrodes 122 is more than twice larger than the thickness of each of the one or more first internal electrodes 121 and the one or more second internal electrodes 122. For example, when the multilayer capacitor 100 is required to have a small size and/or a high capacitance, the multilayer capacitor 100 may be designed such that the thickness of each of the one or more first internal electrodes 121 and the one or more second internal electrodes 122 is 0.4 µm or less, and the total number of one or more first internal electrodes 121 and one or more second internal electrodes 122 stacked is 400 or more.

The first and second external electrodes 131 and 132 may be disposed on the body 110 while being spaced apart from each other to be connected to the one or more first internal electrodes 121 and the one or more second internal electrodes 122, respectively.

For example, each of the first and second external electrodes 131 and 132 may be formed by dipping into a paste including a metal component, printing a conductive paste, transferring a sheet, transferring a pad, sputter plating, electrolytic plating, or the like. For example, each of the first and second external electrodes 131 and 132 may include a sintered layer formed as the paste is sintered and a plating layer formed on an outer surface of the sintered layer, and may further include a conductive resin layer between the sintered layer and the plating layer. For example, the conductive resin layer may be formed of a thermosetting resin such as epoxy containing conductive particles. The metal component may be one of copper (Cu), palladium (Pd), platinum (Pt), gold (Au), silver (Ag), lead (Pb), tin (Sn), and the like, or an alloy thereof, but is not limited thereto.

The multilayer capacitor 100 may be mounted on or embedded in an external substrate (e.g., a printed circuit board), and may be connected to at least one of wirings, lands, solders, and bumps of the external substrate through the first and second external electrodes 131 and 132, thereby being electrically connected to a circuit (e.g., an integrated circuit or a processor) electrically connected to the external substrate.

Referring to FIGS. 1 and 2, the multilayer capacitor 100 according to the exemplary embodiment of the present disclosure may further include a plurality of side margin layers 114 and one or more edge margin portions 111b, 111c, and 111d.

The plurality of side margin layers 114 may be disposed with the multilayer structure 111 interposed therebetween in a second direction (e.g., W direction) perpendicular to the first direction (e.g., T direction). For example, the plurality of side margin layers 114 may include the same material (e.g., barium titanate (BaTiO₃)-based material) as the one or more dielectric layers 111a, and may be formed in a similar manner to the one or more dielectric layers 111a (although different in stacked direction). If necessary, the plurality of side margin layers 114 may be designed in a tin (Sn)-coated structure to have a higher toughness, thereby suppressing cracks therein, while having a higher density.

The plurality of side margin layers 114 may prevent the one or more first internal electrodes 121 and the one or more second internal electrodes 122 from being exposed to the surfaces of the body 110 in the second direction (e.g., W direction), thereby preventing external environmental elements (e.g., moisture, plating solution, foreign substance) from penetrating into the one or more first internal electrodes 121 and the one or more second internal electrodes 122 through the surfaces of the body 110 in the second direction, and improving the reliability and lifespan of the multilayer capacitor 100. Also, the plurality of side margin layers 114 may serve to enable the one or more first internal electrodes 121 and the one or more second internal electrodes 122 to efficiently expand in the second direction, thereby increasing an area where the one or more first internal electrodes 121 and the one or more second internal electrodes 122 overlap each other, resulting in an improvement in capacitance of the multilayer capacitor 100.

The multilayer capacitor 100 may have further improved reliability and lifespan as the plurality of side margin layers 114 are thicker, and the multilayer capacitor 100 may have a higher capacitance compared to its size as the plurality of side margin layers 114 are thinner. For example, each of the plurality of side margin layers 114 may have a thickness of 7 µm or more and 45 µm or less.

As the plurality of side margin layers 114 have a higher degree of adhesion to the sides of the multilayer structure 111, the multilayer capacitor 100 may have further improved performance (e.g., reliability, lifespan, and capacitance). As the plurality of side margin layers 114 more uniformly adhere to the entire sides of the multilayer structure 111, the performance of the multilayer capacitor 100 may be more efficiently improved compared to the degree of adhesion of the plurality of side margin layers 114.

In reality, in the process of forming the plurality of side margin layers 114, and the degree of adhesion of the plurality of side margin layers 114 at the centers thereof may be slightly different from that at edges thereof, and the plurality of side margin layers 114 may also be slightly different from each other in size due to process variations or the like.

The multilayer capacitor 100 according to the exemplary embodiment of the present disclosure may overcome the difference in degree of adhesion between the centers and the edges of the plurality of side margin layers 114 or the difference in size resulting from process variations between the plurality of side margin layers 114, which limit the improvement in performance of the multilayer capacitor 100.

The one or more edge margin portions 111b, 111c, and 111d may include edge margin portions 111d configured to provide a first portion of a margin between edges of at least one of the plurality of side margin layers 114 in a third direction (e.g., L direction) and the multilayer structure 111, and edge margin portions 111b and 111c configured to provide a second portion of the margin between edges of at least one of the plurality of side margin layers 114 in the first direction (e.g., T direction) and the multilayer structure 111. The one or more edge margin portions 111b, 111c, and 111d may include edge portions where internal electrodes do not contact the one or more dielectric layers 111a included in the multilayer structure 111 in the first direction (e.g., T direction), but are not limited thereto.

The one or more edge margin portions 111b, 111c, and 111d may have an effect as if the thickness of the plurality of side margin layers 114 is locally increased at portions where the plurality of side margin layers 114 overlaps the one or more edge margin portions 111b, 111c, and 111d in the second direction (e.g., W direction), similarly to the improvement in degree of adhesion of the plurality of side margin layers 114 at the edges thereof or the increase in size of the plurality of side margin layers 114. As a result, it is possible to more efficiently improve the performance (e.g., reliability, lifespan, and capacitance) of the multilayer capacitor 100. In addition, since the one or more edge margin portions 111b, 111c, and 111d do not actually affect the thickness of the plurality of side margin layers 114, it is possible to efficiently increase the capacitance of the multilayer capacitor 100 compared to its size.

For example, the one or more edge margin portions 111b, 111c, and 111d may be portions where the one or more first internal electrodes 121 and the one or more second internal electrodes 122 are not formed on and under the one or more dielectric layers 111a, and thus, may have similar characteristics to the one or more dielectric layers 111a.

Referring to FIGS. 1 and 2, the one or more first internal electrodes 121 and the one or more second internal electrodes 122 may include upper internal electrodes 121b and 122b, lower internal electrodes 121c and 122c, and central internal electrodes 121a and 122a.

In FIG. 1, dotted lines refer to internal electrodes that are not exposed to the surfaces of the multilayer structure 111. That is, the central internal electrodes 121a and 122a may be disposed between the upper and lower internal electrodes 121b, 122b, 121c, and 122c, and have a greater median width than the upper and lower internal electrodes 121b, 122b, 121c, and 122c. In addition, since the one or more first internal electrodes 121 and the one or more second internal electrodes 122 are not disposed in the edge margin portions 111d, the one or more first internal electrodes 121 and the one or more second internal electrodes 122 may be recessed at a plurality of corners. According to one embodiment of the present disclosure, a 'median width' of an internal electrode may refer to a width of a middle portion of the internal electrode in the third direction (e.g., L direction).

For example, the one or more edge margin portions 111b, 111c, and 111d may be disposed adjacent to all of four edges of the plurality of side margin layers 114, and the central internal electrodes 121a and 122a may be exposed in the second direction (e.g., W direction) to contact the plurality of side margin layers 114. Thus, some of the one or more first internal electrodes 121 and the one or more second internal electrodes 122 may protrude such that partial portions thereof are surrounded by the one or more edge margin portions 111b, 111c, and 111d.

For example, the upper and lower internal electrodes 121b, 122b, 121c, and 122c may not contact the plurality of side margin layers 114, and the central internal electrodes 121a and 122a may contact the plurality of side margin layers 114. Thus, the one or more first internal electrodes 121 and the one or more second internal electrodes 122 may partially contact the plurality of side margin layers 114.

Referring to FIGS. 1 and 2, the body 110 may further include an upper cover layer 112 and a lower cover layer 113. The upper and lower cover layers 112 and 113 may be disposed with the multilayer structure 111 interposed therebetween in the first direction (e.g., T direction), and each of the upper and lower cover layers 112 and 113 may be thicker than each of the one or more dielectric layers 111a.

The upper and lower cover layers 112 and 113 may serve to prevent external environmental elements (e.g., moisture, plating solution, foreign substance) from penetrating into the multilayer structure 111, protect the body 110 against external impact, and improve a flexural strength of body 110.

For example, the upper and lower cover layers 112 and 113 may include a material (e.g., thermosetting resin such as epoxy resin) identical to or different from that of the one or more dielectric layers 111a.

The one or more edge margin portions 111b, 111c, and 111d may be disposed between the upper and lower cover layers 112 and 113, and each of the upper and lower cover layers 112 and 113 may be disposed between the plurality of side margin layers 114.

The plurality of side margin layers 114 may improve adhesion between the multilayer structure 111 and the upper and lower cover layers 112 and 113. In a case where the degree of adhesion between the plurality of side margin layers 114 and the upper and lower cover layers 112 and 113 is slightly different from that of the plurality of side margin layers 114 at the centers thereof, the one or more edge margin portions 111b, 111c, and 111d may reduce an influence of the difference in degree of adhesion of the plurality of side margin layers 114. In addition, the edge margin portions 111b and 111c may improve a bonding force between the multilayer structure 111 and the upper and lower cover layers 112 and 113, thereby efficiently suppressing delamination between the multilayer structure 111 and the upper and lower cover layers 112 and 113.

Each of the first and second external electrodes 131 and 132 may be disposed on the surface of the body 110 in the third direction (e.g., L direction), and may also be disposed on partial portions of outer surfaces of the plurality of side margin layers 114 and on partial portions of respective outer surfaces of the upper and lower cover layers 112 and 113. For example, each of the first and second external electrodes 131 and 132 may include a bent portion. When the bent portion is formed by dipping, a length of the bent portion may be adjusted by adjusting a dipping depth.

The first and second external electrodes 131 and 132 may improve adhesion between the plurality of side margin layers 114 and the upper and lower cover layers 112 and 113, and penetration of external environmental elements (e.g., moisture and plating solution) in the process of forming the first and second external electrodes 131 and 132 may be prevented by the one or more edge margin portions 111b, 111c, and 111d.

Figure 3A:
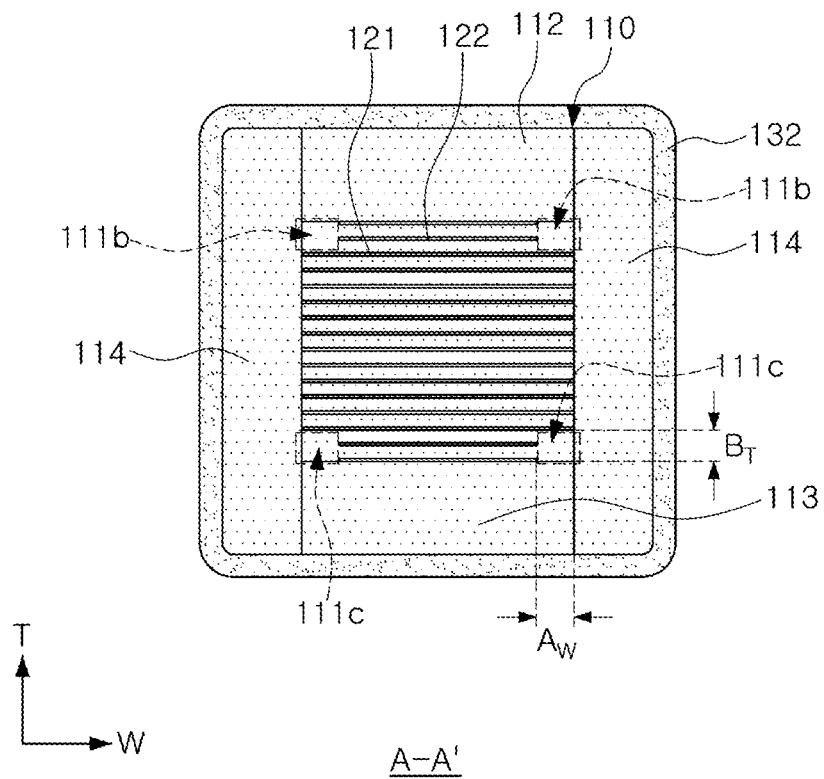
FIG. 3A is a cross-sectional view taken along line A-A' of FIG. 2.
Figure 3B:
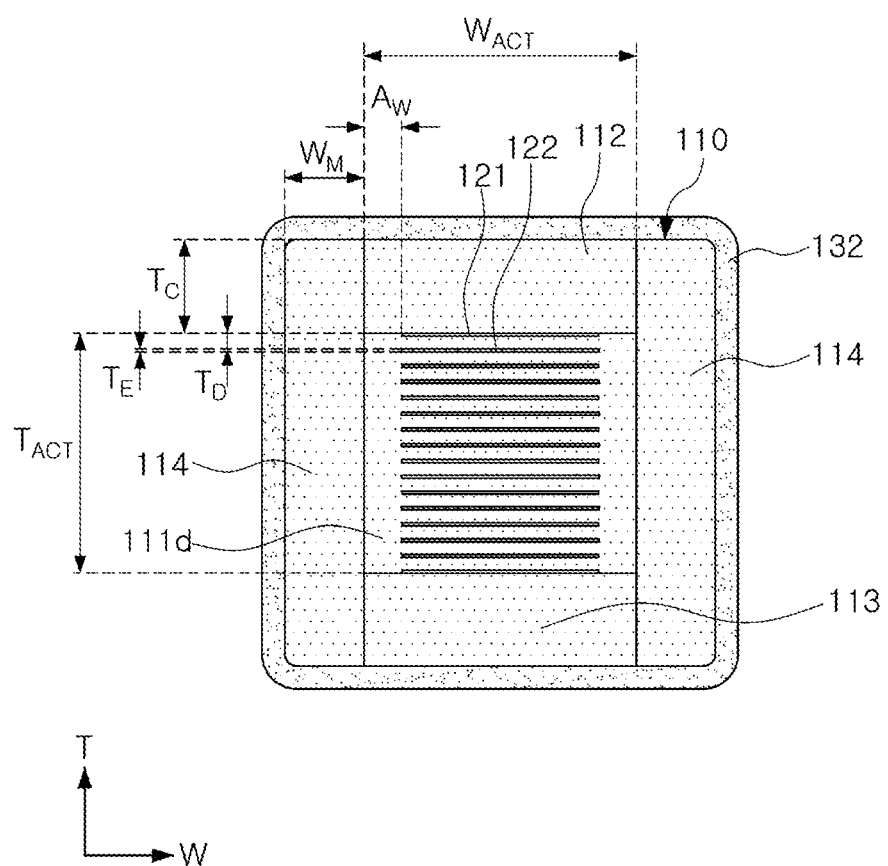
FIG. 3B is a side view illustrating the body of FIG. 1 when viewed in an L direction.

FIG. 3A is a cross-sectional view taken along line A-A' of FIG. 2, and FIG. 3B is a side view illustrating the body of FIG. 1 when viewed in the L direction.

Referring to FIG. 3A, each of a first-direction length $B_T$ and a second-direction length $A_W$ of the second portion of a margin (e.g., a cross section of each of the edge margin portions 111b and 111c) between an edge of one of the plurality of side margin layers 114 in the first direction and the multilayer structure may be more than 10 μm and less than 70 μm.

The second-direction length $A_W$ may be equal to a difference between the median width of the central internal electrodes 121a and 122a and the median width of the upper and lower internal electrodes 121b, 122b, 121c, and 122c, and may be equal to a recessed length of the central internal electrodes 121a and 122a in the second direction (e.g., W direction) at a plurality of corners thereof. The first-direction length $B_T$ may be equal to a difference between a distance from a surface of the body in the first direction to an internal electrode closest to the center of the surface of the body in the first direction (e.g., T direction) among the one or more first internal electrodes 121 and the one or more second internal electrodes 122, and a distance from the surface of the body in the first direction (e.g., T direction) to an internal electrode closest to the edge of the surface of the body 110 in the first direction (e.g., T direction) among the one or more first internal electrodes 121 and the one or more second internal electrodes 122.

For example, the first-direction length $B_T$ and the second-direction length $A_W$ may be measured by analysis using at least one of a transmission electron microscopy (TEM), an atomic force microscope (AFM), a scanning electron microscope (SEM), an optical microscope, and a surface profiler. For example, several (e.g., one or more) multilayer capacitor samples may be prepared for measurement, and each of the multilayer capacitor samples may be used to measure first-direction and second-direction lengths $B_T$ and $A_W$ in a state in which the multilayer capacitor sample is polished to expose the one or more first internal electrodes 121 and the one or more second internal electrodes 122 in the third direction (e.g., L direction) in a cross section thereof. For example, the cross section may be a cross section obtained by cutting the center of the multilayer capacitor sample, and the multilayer capacitor sample may be provided in a state in which at least a portion thereof is molded. The first-direction length $B_T$ may be calculated as a value obtained by integrating the first-direction length of the edge margin portion in the second direction in the cross section and dividing the result by the second-direction length (or an average value of first-direction lengths), and the second-direction length $A_W$ may be calculated as a value obtained by integrating the second-direction length of the edge margin portion in the first direction in the cross section and dividing the result by the first-direction length (or an average value of second-direction lengths).

Table 1 below shows whether moisture resistance reliability is poor, whether capacitance is poor, and whether breakdown voltage BDV greatly decreases depending on the first-direction length $B_T$ and the second-direction length $A_W$. Here, whether capacitance is poor may be determined based on whether the capacitance decreases by 10% or more from its maximum value, and whether breakdown voltage BDV greatly decreases may be determined based on whether the breakdown voltage BDV decreases by 10% or more from its maximum value.

TABLE 1

| Sample no. | $A_W$ (μm) | $B_T$ (μm) | Whether moisture resistance reliability is poor | Whether capacitance is poor | Whether BDV greatly decreases |
|---|---|---|---|---|---|
| 1 | 10 | 10 | NG | OK | OK |
| 2 | 20 | 20 | OK | OK | OK |
| 3 | 30 | 30 | OK | OK | OK |
| 4 | 40 | 40 | OK | OK | OK |
| 5 | 50 | 50 | OK | OK | OK |
| 6 | 60 | 60 | OK | OK | OK |
| 7 | 70 | 70 | OK | OK | NG |
| 8 | 80 | 80 | OK | NG | NG |

When the first-direction length $B_T$ and the second-direction length $A_W$ are more than 10 μm, the multilayer capacitor 100 may have an improved moisture resistance reliability. When the first-direction length $B_T$ and the second-direction length $A_W$ are less than 70 μm, the multilayer capacitor 100 may have a high capacitance and a high breakdown voltage. Therefore, when the first-direction length $B_T$ and the second-direction length $A_W$ are more than 10 μm and less than 70 μm, the multilayer capacitor 100 may have an improved moisture resistance reliability, a high capacitance, and a high breakdown voltage. A difference between a half of a median width of each of the central internal electrodes 121a and 122a and a half of a median width of each of the upper and lower internal electrodes 121b, 122b, 121c and 122c may be more than 10 μm and less than 70 μm. In another embodiment of the present disclosure, the first-direction length $B_T$ and the second-direction length $A_W$ may be more than equal to 20 μm and less than equal to 60 μm.

Referring to FIGS. 3A and 3B, in the sample of Table 1, the body 110 may have a width ($W_{ACT}+2*W_M$) of 0.2 mm or more and 0.5 mm or less. Thus, the second-direction length $A_W$ of each of the one or more edge margin portions 111b, 111c, and 111d may be less than 14% (70/500 times) of the width ($W_{ACT}+2*W_M$) of the body 110. For example, when the width ($W_{ACT}+2*W_M$) of the body 110 decreases, a maximum value of an optimal range for the second-direction length $A_W$ may also decrease. For example, when the width ($W_{ACT}+2*W_M$) of the body 110 is 0.2 mm or 0.3 mm, the maximum value of the optimal range for the second-direction length $A_W$ may be 25 μm or 35 μm. For example, the width ($W_{ACT}+2*W_M$) may correspond to one of 02, 03, and 05 of sizes 0402, 0603, and 1005 for the multilayer capacitor.

In the sample of Table 1, each of the plurality of side margin layers 114 may have a thickness $W_M$ of 7 μm or more and 45 μm or less, and a distance between a surface of the body 110 in the second direction (e.g., W direction) and non-recessed portions of the central internal electrodes 121a and 122a may be 7 μm or more and 45 μm or less. The body 110 may have a length of 0.4 mm or more and 1.0 mm or less in the third direction (e.g., L direction). For example, the thickness $W_M$ may be measured in the same manner as the first-direction and second-direction lengths $B_T$ and $A_W$, and may be calculated as a value obtained by integrating the second-direction length of each of the plurality of side margin layers 114 in the first direction in the cross section of the multilayer capacitor sample (e.g., the cross section at the center thereof) and dividing the result by the first-direction length (or an average value of second-direction lengths).

In the sample of Table 1, each of the upper and lower cover layers 112 and 113 may have a thickness $T_C$ of 12 μm or more and 60 μm or less, which may be greater than the thickness $T_D$ of the one or more dielectric layers 111a. A distance between the surface of the body 110 in the first direction and an internal electrode closest to the center of the surface of the body 110 in the first direction (e.g., T direction) among the one or more first internal electrodes 121 and the one or more second internal electrodes 122 may be 12 μm or more and 60 μm or less. For example, the thickness $T_C$ may be measured in the same manner as the first-direction and second-direction lengths $B_T$ and $A_W$, and may be calculated as a value obtained by integrating the first-direction length of each of the upper and lower cover layers 112 and 113 in the second direction in the cross section of the multilayer capacitor sample (e.g., the cross section at the center thereof) and dividing the result by the second-direction length (or an average value of first-direction lengths).

In the sample of Table 1, the thickness $W_M$ of each of the plurality of side margin layers 114 may be larger than the thickness $T_D$ of each of the one or more dielectric layers 111a, and smaller than the thickness $T_C$ of each of the upper and lower cover layers 112 and 113.

In the sample of Table 1, a difference between the first-direction length $B_T$ and the second-direction length $A_W$ of the second portion of the margin between the multilayer structure and the edge of one of the plurality of side margin layers 114 in the first direction may be smaller than a difference between the thickness $W_M$ of each of the plurality of side margin layers 114 and the thickness $T_C$ of each of the upper and lower cover layers 112 and 113. That is, the one or more edge margin portions 111b, 111c, and 111d may have substantially square cross sections.

Each of the one or more first internal electrodes 121 and the one or more second internal electrodes 122 may have a thickness $T_E$ of 0.35 μm or more and 0.70 μm or less, and the total number of one or more first internal electrodes 121 and one or more second internal electrodes 122 stacked may be 150 or more and 900 or less. The total number of internal electrodes stacked may increase as the size of the body 110 increases. For example, when the body 110 has a width ($W_{ACT}+2*W_M$) of 0.2 mm, 0.3 mm, or 0.5 mm, the total number of internal electrodes stacked may be 150 to 300, 170 to 400, or 300 to 900. A thickness $T_{ACT}$ of the multilayer structure may be based on the thickness $T_D$, the thickness $T_E$, and the total number of internal electrodes stacked.

Figure 5A:
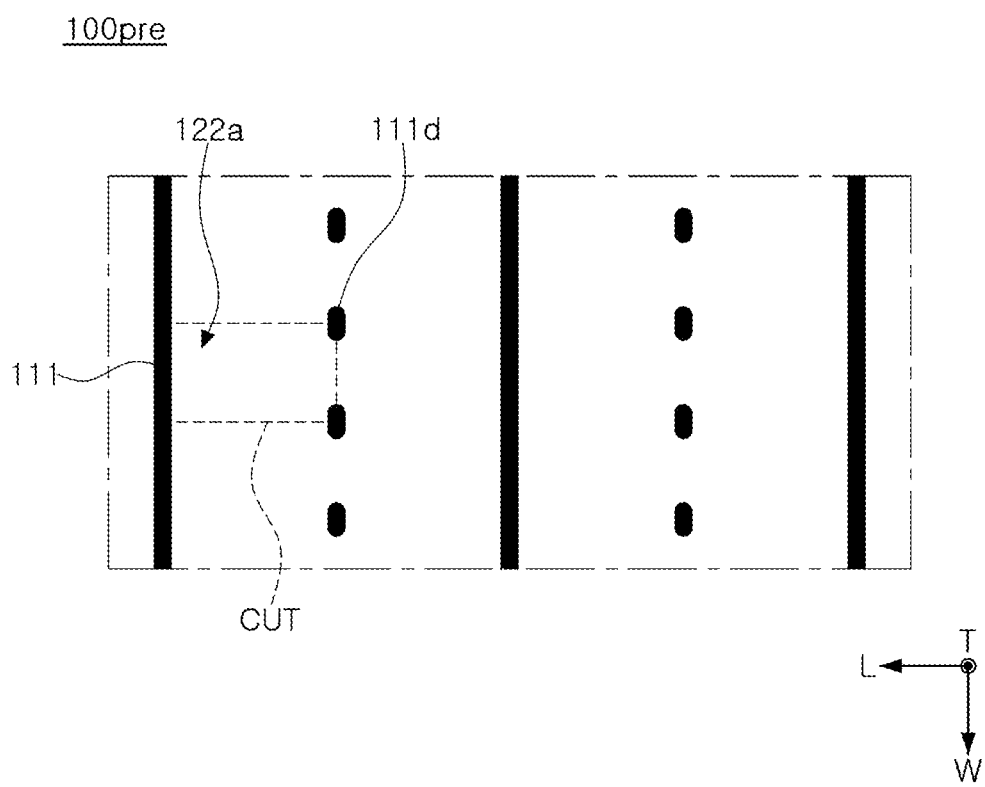
FIG. 5A is a plan view illustrating a central internal electrode of a multilayer capacitor before a cutting process according to an exemplary embodiment of the present disclosure.
Figure 5B:
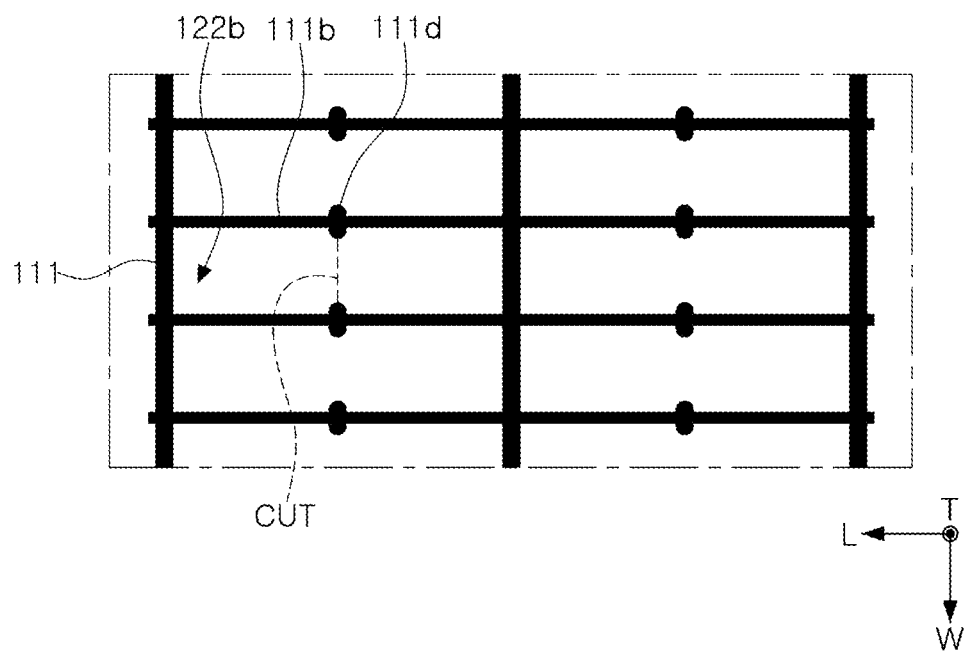
FIG. 5B is a plan view illustrating an upper internal electrode of the multilayer capacitor before the cutting process according to the exemplary embodiment of the present disclosure.

FIG. 5A is a plan view illustrating a central internal electrode of a multilayer capacitor before a cutting process according to an exemplary embodiment of the present disclosure, and FIG. 5B is a plan view illustrating an upper internal electrode of the multilayer capacitor before the cutting process according to the exemplary embodiment of the present disclosure.

Referring to FIGS. 5A and 5B, a multilayer capacitor 100 pre before a cutting process may be cut along a cut line CUT in a state in which a plurality of multilayer structures 111 are connected to one another. Accordingly, the mass productivity of a plurality of multilayer capacitors may be increased.

For example, the edge margin portions 111d may be formed by denting the central internal electrodes 121a and 122a at a plurality of corners thereof. The edge margin portions 111b and 111c may be formed by making the upper internal electrodes 121b and 122b and the lower internal electrodes 121c and 122c to have a smaller width in the W direction than the central internal electrodes 121a and 122a.

As set forth above, according to the exemplary embodiment in the present disclosure, the overall performance (e.g., reliability, capacitance, and miniaturization) of the multilayer capacitor can be efficiently improved because side reliability can be improved without substantially increasing a side size or sacrificing a capacitance.

In addition, in a case where the multilayer capacitor includes a cover layer, delamination between the cover layer and the multilayer structure can be suppressed.

While exemplary embodiments have been shown and described above, it will be apparent to those skilled in the art that modifications and variations could be made without departing from the scope of the present disclosure as defined by the appended claims.

What is claimed is:

1. A multilayer capacitor comprising:
a body including a multilayer structure in which one or more first internal electrodes and one or more second internal electrodes are alternately stacked in a first direction with one or more dielectric layers interposed therebetween; and
first and second external electrodes disposed on the body and spaced apart from each other to be connected to the one or more first internal electrodes and the one or more second internal electrodes, respectively,
wherein the body further includes:
a plurality of side margin layers with the multilayer structure interposed therebetween in a second direction, perpendicular to the first direction; and
one or more edge margin portions configured to provide a margin,
wherein a first portion of the margin is disposed between an edge of at least one of the plurality of side margin layers in a third direction and the multilayer structure, the third direction being perpendicular to the first and second directions, and
wherein a second portion of the margin is disposed between an edge of at least one of the plurality of side margin layers in the first direction and the multilayer structure,
wherein the first portion and the second portion are configured such that at least one of the following characteristics is satisfied:

1) The first portion exists in an entire edge region of the multilayer structure between uppermost and lowermost surfaces of the multilayer structure in the first direction, or
2) The second portion exists in an entire edge region of the multilayer structure between two end surfaces of the multilayer structure in the third direction.

2. The multilayer capacitor of claim 1, wherein some of the one or more first internal electrodes and the one or more second internal electrodes protrude such that partial portions thereof are surrounded by the one or more edge margin portions.

3. The multilayer capacitor of claim 2, wherein the one or more first internal electrodes and the one or more second internal electrodes partially contact the plurality of side margin layers.

4. The multilayer capacitor of claim 1, wherein the body further includes upper and lower cover layers disposed with the multilayer structure interposed therebetween in the first direction, each of the upper and lower cover layers being thicker than each of the one or more dielectric layers,
the one or more edge margin portions are disposed between the upper and lower cover layers, and
each of the upper and lower cover layers is disposed between the plurality of side margin layers.

5. The multilayer capacitor of claim 4, wherein each of the first and second external electrodes is disposed on a surface of the body in the third direction, and is disposed on partial portions of outer surfaces of the plurality of side margin layers and on partial portions of respective outer surfaces of the upper and lower cover layers.

6. The multilayer capacitor of claim 4, wherein each of the plurality of side margin layers is thicker than each of the one or more dielectric layers, and thinner than each of the upper and lower cover layers.

7. The multilayer capacitor of claim 6, wherein a difference between a first-direction length and a second-direction length of the second portion of the margin is smaller than a difference between a thickness of each of the plurality of side margin layers and a thickness of each of the upper and lower cover layers.

8. The multilayer capacitor of claim 4, wherein each of the plurality of side margin layers has a thickness of 7 µm or more and 45 µm or less,
each of the upper and lower cover layers has a thickness of 12 µm or more and 60 µm or less, and
each of a first-direction length and a second-direction length of the second portion of the margin is more than 10 µm and less than 70 µm.

9. The multilayer capacitor of claim 1, wherein each of a first-direction length and a second-direction length of the second portion of the margin is more than 10 µm and less than 70 µm.

10. The multilayer capacitor of claim 9, wherein a second-direction length of each of the one or more edge margin portions is less than 14% of a width of the body in the second direction.

11. The multilayer capacitor of claim 10, wherein each of the one or more dielectric layers and the plurality of side margin layers contains a barium titanate ($BaTiO_3$)-based ceramic material.

12. The multilayer capacitor of claim 1, wherein the one or more first internal electrodes and the one or more second internal electrodes include:
upper and lower internal electrodes; and
central internal electrodes disposed between the upper and lower internal electrodes, having a greater median width than the upper and lower internal electrodes, and recessed at a plurality of corners.

13. A multilayer capacitor comprising:
a body including a multilayer structure in which one or more first internal electrodes and one or more second internal electrodes are alternately stacked in a first direction with one or more dielectric layers interposed therebetween; and
first and second external electrodes disposed on the body and spaced apart from each other to be connected to the one or more first internal electrodes and the one or more second internal electrodes, respectively, in a second direction, perpendicular to the first direction,
wherein the one or more first internal electrodes and the one or more second internal electrodes include:
upper and lower internal electrodes; and
central internal electrodes disposed between the upper and lower internal electrodes recessed at a plurality of corners, having a greater median width than the upper and lower internal electrodes,
wherein the median width is defined as a width of a middle portion of a corresponding internal electrode in a third direction, perpendicular to the first and second directions.

14. The multilayer capacitor of claim 13, wherein a difference between a half of the median width of each of the central internal electrodes and a half of the median width of each of the upper and lower internal electrodes is more than 10 μm and less than 70 μm, and
a recessed length of the central internal electrodes in a second direction, perpendicular to the first direction, at each of a plurality of corners thereof is more than 10 μm and less than 70 μm.

15. The multilayer capacitor of claim 14, wherein a distance between a surface of the body in the second direction and non-recessed portions of the central internal electrodes is 7 μm or more and 45 μm or less.

16. The multilayer capacitor of claim 15, wherein a distance between a surface of the body in the first direction and an internal electrode closest to a center of the surface of the body in the first direction among the upper and lower internal electrodes is 12 μm or more and 60 μm or less, which is smaller by more than 10 μm and less than 70 μm than a distance between the surface of the body in the first direction and an internal electrode closest to an edge of the surface of the body in the first direction among the central internal electrodes internal electrodes.

17. A multilayer capacitor comprising:
a body including a multilayer structure in which one or more first internal electrodes and one or more second internal electrodes are alternately stacked in a first direction with one or more dielectric layers interposed therebetween; and
first and second external electrodes disposed on the body and spaced apart from each other to be connected to the one or more first internal electrodes and the one or more second internal electrodes, respectively,
wherein the body further includes cover layers disposed above and below the multilayer structure in the first direction, and side margin layers with the multilayer structure interposed therebetween in a second direction perpendicular to the first direction, the multilayer structure being surrounded by the cover layers and the side margin layers,
in a view from the first direction, the multilayer structure has a first cutout portion at each corner thereof, the first cutout portion being free of a portion of an internal electrode, and
in a cross-section view from a third direction, perpendicular to the first and second directions, the multilayer structure includes a second cutout portion at each corner thereof, the second cutout portion being free of an internal electrode,
wherein the first cutout portion and the second cutout portion are configured such that at least one of the following characteristics is satisfied:
1) The first cutout portion exists in an entire edge region of the multilayer structure between uppermost and lowermost surfaces of the multilayer structure in the first direction, or
2) The second cutout portion exists in an entire edge region of the multilayer structure between two end surfaces of the multilayer structure in the third direction.

18. The multilayer capacitor of claim 17, wherein:
each of the side margin layers has a thickness of 7 μm or more and 45 μm or less,
each of the cover layers has a thickness of 12 μm or more and 60 μm or less, and
each of a first-direction length and a second-direction length of the second cutout portion is more than 10 μm and less than 70 μm.

19. The multilayer capacitor of claim 17, wherein a second-direction length of each of the first and second cutout portions is less than 14% of a width of the body in the second direction.

20. The multilayer capacitor of claim 17, wherein the one or more first internal electrodes and the one or more second internal electrodes include:
upper and lower internal electrodes; and
central internal electrodes disposed between the upper and lower internal electrodes and having a greater median width than the upper and lower internal electrodes by a second-direction length of the second cutout portion.

* * * * *